(12) United States Patent
Erb et al.

(10) Patent No.: US 10,562,214 B2
(45) Date of Patent: Feb. 18, 2020

(54) METHOD FOR PRODUCING A VEHICLE SUBSTRUCTURE, AND VEHICLE SUBSTRUCTURE

(71) Applicants: Dr. Ing. h.c. F. Porsche Aktiengesellschaft, Stuttgart (DE); Plan B Engineering Solutions GmbH, Frankfurt am Main (DE)

(72) Inventors: Thiemo Erb, Stuttgart (DE); Markus Brunner, Sachsenheim (DE); Norbert Schwan, Rutesheim (DE); Kai Kretzschmar, Hainburg (DE)

(73) Assignees: Dr. Ing. h.c. F. Porsche Aktiengesellschaft (DE); Plan B Engineering Solutions GmbH (DE)

( * ) Notice: Subject to any disclaimer, the term of this patent is extended or adjusted under 35 U.S.C. 154(b) by 0 days.

(21) Appl. No.: 15/722,313

(22) Filed: Oct. 2, 2017

(65) Prior Publication Data

US 2018/0093399 A1    Apr. 5, 2018

(30) Foreign Application Priority Data

Oct. 4, 2016  (DE) ........................ 10 2016 118 736

(51) Int. Cl.
*B29C 45/14* (2006.01)
*B60K 11/04* (2006.01)
*B29C 45/00* (2006.01)
*B29K 101/12* (2006.01)
*B29L 31/30* (2006.01)

(52) U.S. Cl.
CPC .. *B29C 45/14008* (2013.01); *B29C 45/14786* (2013.01); *B60K 11/04* (2013.01); *B29C 2045/0093* (2013.01); *B29K 2101/12* (2013.01); *B29L 2031/30* (2013.01)

(58) Field of Classification Search
None
See application file for complete search history.

(56) References Cited

U.S. PATENT DOCUMENTS

2005/0276874 A1    12/2005    Menaldo et al.

FOREIGN PATENT DOCUMENTS

| DE | 102007014258 A1 | 10/2007 |
| DE | 102009021151 A1 | 11/2010 |
| DE | 102013108064 A1 | 1/2015 |
| JP | 2005001314 A | 1/2005 |

(Continued)

OTHER PUBLICATIONS

Notification of Reasons for Refusal for Japanese Application No. 2017-190498, dated Dec. 4, 2018, with translation, 9 pages.

(Continued)

*Primary Examiner* — Monica A Huson
(74) *Attorney, Agent, or Firm* — RatnerPrestia

(57) ABSTRACT

A method for producing a vehicle substructure with at least one first component, and also a vehicle substructure, are described herein. The first component is connectable to a second component by an installation connection. The first component is manufactured from a material which is not suitable for reversible deformations. A latching device having a deformable latching element is attached here to the first component. For this purpose, the first component is inserted into an injection molding device and is insert-molded with a reversibly deformable plastic. The latching device is produced here by injection molding and attached to the first component.

9 Claims, 3 Drawing Sheets

(56) References Cited

FOREIGN PATENT DOCUMENTS

| | | |
|---|---|---|
| JP | 2007532364 A | 11/2007 |
| JP | 2011183585 A | 9/2011 |
| JP | 2014061767 A | 4/2014 |

OTHER PUBLICATIONS

German Search Report for German Application No. 10 2016 118 736.4, dated Jul. 11, 2017, with partial translation—9 pages.

METHOD FOR PRODUCING A VEHICLE SUBSTRUCTURE, AND VEHICLE SUBSTRUCTURE

CROSS-REFERENCE TO RELATED APPLICATIONS

This application claims priority to German Patent Application No. DE 10 2016 118 736.4, filed Oct. 4, 2016, the content of such application being incorporated by reference herein in its entirety.

FIELD OF THE INVENTION

The present invention relates to a method for producing a vehicle substructure with at least one first component, and also to a vehicle substructure.

BACKGROUND OF THE INVENTION

During the production of components and parts for the automobile sector, use is increasingly being made of fiber composite materials and, for example, carbon fiber reinforced plastic (CFRP). The reinforcing fibers are frequently embedded here in a thermosetting matrix material. Taking into consideration the predetermined requirements regarding stability, such components generally provide a particularly low weight and a highly attractive appearance, However, the installation of such components on the vehicle or on other parts is often highly complicated and therefore costly. The components cannot be fitted by latching connections and, for example, by clipping because of the lack of elasticity of the thermosetting material.

In the prior art, thermosetting components and, for example, CFRP components are generally fastened by very time-consuming adhesive bonding processes. The adhesive bonding connections also have the disadvantage that a time-intensive orientation of the components to be adhesively bonded together generally has to take place before they are finally secured by the adhesive bonding connection.

SUMMARY OF THE INVENTION

Described herein are improved components for vehicle substructures composed of materials which are not reversibly deformable and in particular of thermosetting plastics in such a manner that said components can be fitted more rapidly and reliably.

The method according to aspects of the invention serves for producing a vehicle substructure with at least one first component. The first component is connectable, to at least one second component by an installation connection. The first component is manufactured from a material which is not suitable for reverse deformations. At least one latching device is attached here to the first component. The latching device comprises at least one deformable latching element. For this purpose, the first component is inserted into an injection molding device. The first component is insert molded at least in sections with at least one reversibly deformable material in the injection molding device. The latching device is produced here by injection molding and attached to the first component.

The method according to aspects of the invention has many advantages. One considerable advantage is that at least one latching device having at least one deformable latching element is attached to the first component by injection molding. As a result, the first component, despite its inelastic or thermosetting properties, can be provided with a deformable latching element. A particularly rapid and at the same time highly reliable installation of the first component is thus possible by means of a latching connection.

In addition, the latching device has the advantage that an alignment also takes place at the same time as the components are connected. For example, the alignment takes place by the fact that the latching element is latchable only in an aligned position.

The first component is particularly preferably at least partially formed from a thermosetting material. In particular, the first component is formed from a thermosetting plastic or from a thermoset. Such a first component provides high as stability at a correspondingly low weight. In addition, a component made of such a material is particularly thermally stable.

The first component s manufactured in particular from a material which is not suitable for a reversible deformation occurring during a latching connection.

The first component is particularly preferably at least partially formed from a fiber composite material. For this purpose, at least one fiber reinforcement is preferably incorporated into the first component. Reinforcing fibers are preferably embedded into a thermosetting plastic which serves as matrix material. The first component can also be completely formed from a thermosetting plastic.

The fiber reinforcement comprises, for example, carbon fibers and/or glass fibers and/or other suitable fiber materials. The fiber composite material is designed, for example, as a carbon fiber reinforced plastic (CFRP) and/or as a glass fiber reinforced plastic (GFRP). A first component composed of a fiber composite material is durable both mechanically and thermally, and provides a low weight and an attractive appearance.

The first component is particularly preferably arranged visibly on or in a vehicle. For example, the first component is used as what is referred to as a visible carbon component. In a visible carbon component, the characteristic appearance of carbon fiber reinforced plastic is used as an optical design element. For example, such a component can be arranged on a wing or a radiator grille.

Such CFRP components cannot be installed by latching connections and, for example, by clipping because of their lack of deformability or elasticity. The attaching according to aspects of the invention a the latching device by injection molding is therefore particularly advantageous in such components.

The latching device is preferably at least partially formed from a thermoplastic. In particular, the latching device is completely formed from a thermoplastic. Thermoplastics or thermoplastic polymers are particularly readily suitable for injection molding and can therefore be used particularly advantageously for attaching the latching device. In addition, thermoplastics are reversibly deformable or flexible, and therefore they are particularly readily suitable for producing the latching element.

At least one undercut is preferably formed between the first component and the latching device by means of the injection molding. The undercut is suitable and designed to block a separation of the attached latching device from the first component in a form-fitting manner. This permits a permanent and reliable connection of the latching device and component, and therefore they can be handled as an integral assembly during further installation operations. For example, the first component can have a three-dimensional shape which is insert molded with the reversibly deformable plastic in such a manner that the latching device is connected to the first component in a form-fitting manner.

It is also possible for the first component and the latching device to be at least partially connected to each other by means of at least one integrally bonded connection. The integrally bonded connection is produced in particular during the injection molding.

At least one recess for the undercut is preferably introduced into the first component. The reversibly deformable plastic is also introduced into the recess during the injection molding. Such an undercut with at least one recess can be produced in an uncomplicated manner, for example by drilling, milling and/or other abrading methods or else by recessing, during the manufacturing.

Such, a configuration is particularly of advantage if the first component is manufactured from a CFRP or GFRP. In the case of these materials, the introduction of recesses is often less complicated than the formations of elevations or projections. Such a configuration is also particularly advantageous if the first component has a three-dimensional shape which would have to be insert molded very extensively or in a complicated manner for an undercut. For example, this is the case with fins which are intended to be substantially exposed and are intended to be covered only in regions at their ends by the latching device.

Two or three or a multiplicity of recesses are particularly preferably introduced into the first component. A particularly firm support is therefore ensured. The recess is introduced into the injection molding device in particular before the insertion of the first component. In particular, the recess is incorporated after the shaping or curing of the first component. However, it is also possible for the recess to be incorporated during the shaping of the first component.

It is also possible for at least one elevation to be arranged on the first component for the undercut. In particular, the elevation is insert molded by the reversibly deformable plastic during the injection molding. Such an elevation also permits a firm connection between latching device and first component.

The second component is also produced in an advantageous refinement of the method according to aspects of the invention. The vehicle substructure comprises in particular at least one second component. The second component is manufactured with at least one latching unit. The latching unit is connectable in particular to the latching element of the latching device. The second component is preferably connected to the first component by latching unit and latching element together. The second component is preferably produced from a plastics material.

Two or more second components can also be produced. It is also possible for two or more first components to be produced. In this case, at least one first component can be connected to at least one second component in each case by latching at least one latching unit and at least one latching element together. For example, a plurality of first components can be installed on a second component by latching.

In a possible development of the method, the first component is manufactured as a finned element. The second component is manufactured in particular as a support frame for the finned element and in particular for a multiplicity of finned elements. The support frame is then preferably installed on a motor vehicle. Such a vehicle substructure is provided, for example, for an air inlet and/or a visibility screen in the outer skin of a vehicle. For example, the vehicle substructure is designed as a wing component.

In the case of elongate finned elements, two or more latching devices are preferably provided. The latching devices are attached, for example, to the ends of the finned elements. In the case of shorter finned elements, just one latching device can also be provided. The latching device can comprise two or more latching elements.

The vehicle substructure according to aspects of the invention comprises at least one first component which is provided for the installation connection to at least one second component. The first component is formed from a less flexible material which in particular is not suitable for reverse deformations. The first component is fixedly connected here to at least one latching device by means of injection molding. The latching device comprises at least one deformable latching element for producing a latching connection in particular to the second component. The latching element is formed from a more flexible material.

The vehicle substructure according to aspects of the invention likewise provides many advantages. The latching device fixedly connected by means of injection molding permits a rapid and uncomplicated installation of the first component.

The latching device is formed in particular by injection molding. The latching is element is designed in particular to be elastically deformable. The latching connection is designed in particular to be releasable and re-latchable. This permits, for example, a cost-effective and uncomplicated exchange of components. The first component and the latching device are in particular connected to each other such that they cannot be released without being destroyed.

At least one undercut is particularly preferably formed between the first component and the latching device. The undercut is suitable and is designed to block a separation of the latching device from the first component in a form-fitting manner in particular in all directions of movement. Such an undercut provides a stable and durable connection.

The undercut preferably comprises at least one recess arranged in the first component. The latching device is preferably at least partially cast into the recess. The latching device preferably also extends over at least one surface of the first component, which surface is adjacent to the recess. It is also possible for the first component to comprise at least one elevation which is surrounded by the latching device in order to form the undercut.

The first component is preferably at least partially formed from a thermosetting material or comprises at least one such material. The first component is particularly preferably at least partially formed from a fiber composite material or comprises such a material, for example CFRP or GFRP. It is also possible for the first component to comprise further parts. The first component particularly preferably comprises at least one thermosetting plastic as matrix material for at least one fiber reinforcement embedded therein. The fiber reinforcement is preferably formed from carbon fibers and/or glass fibers. Such a first component provides high stability at a correspondingly low weight.

The first component is formed in particular from a material which is not suitable in for a reversible deformation occurring during a latching connection. The first component is formed in particular from a less flexible material than the material of the latching device. The first component is formed in particular from a brittle material.

The latching device is preferably formed from a thermoplastic or comprises at least one such thermoplastic. The latching device can also be formed from at least one other reversibly deformable and in particular injection-moldable material. The latching element and preferably the entire latching device are manufactured in particular from a more flexible material than the first component. Such a latching device can be produced cost-effectively and provides a good latching connection because of the elastic properties.

The vehicle substructure comprises in particular at least one second component with at least one latching unit. The latching unit is latchable in particular to the latching element of the latching device. The first component is preferably connectable to the second component by means of at least one latching, connection. Such a vehicle substructure provides an uncomplicated installation of the various components.

In an exemplary refinement, the first component comprises, at least one finned element. The second component comprises in particular at least one support frame for the finned element or is designed as such. The support frame is particularly preferably designed for receiving a multiplicity of finned elements. The vehicle substructure is designed in particular as a wing component.

The latching device is preferably suitable and designed for clipping to the second component. The latching element is designed in particular as a clip or comprises at least one such dip.

It is possible for the latching device to comprise at least one, connection element. The connection element is in particular suitable and designed to connect the latching element to the first component. For example, the connection element is designed as a frame. The connection element is preferably partially formed around the first component during the injection molding. Connection element and latching element are preferably formed integrally.

BRIEF DESCRIPTION OF THE DRAWINGS

Further advantages and features of the present invention emerge from the exemplary embodiments which are explained below with respect to the attached figures, in which.

DETAILED DESCRIPTION OF THE INVENTION

Figure 1:
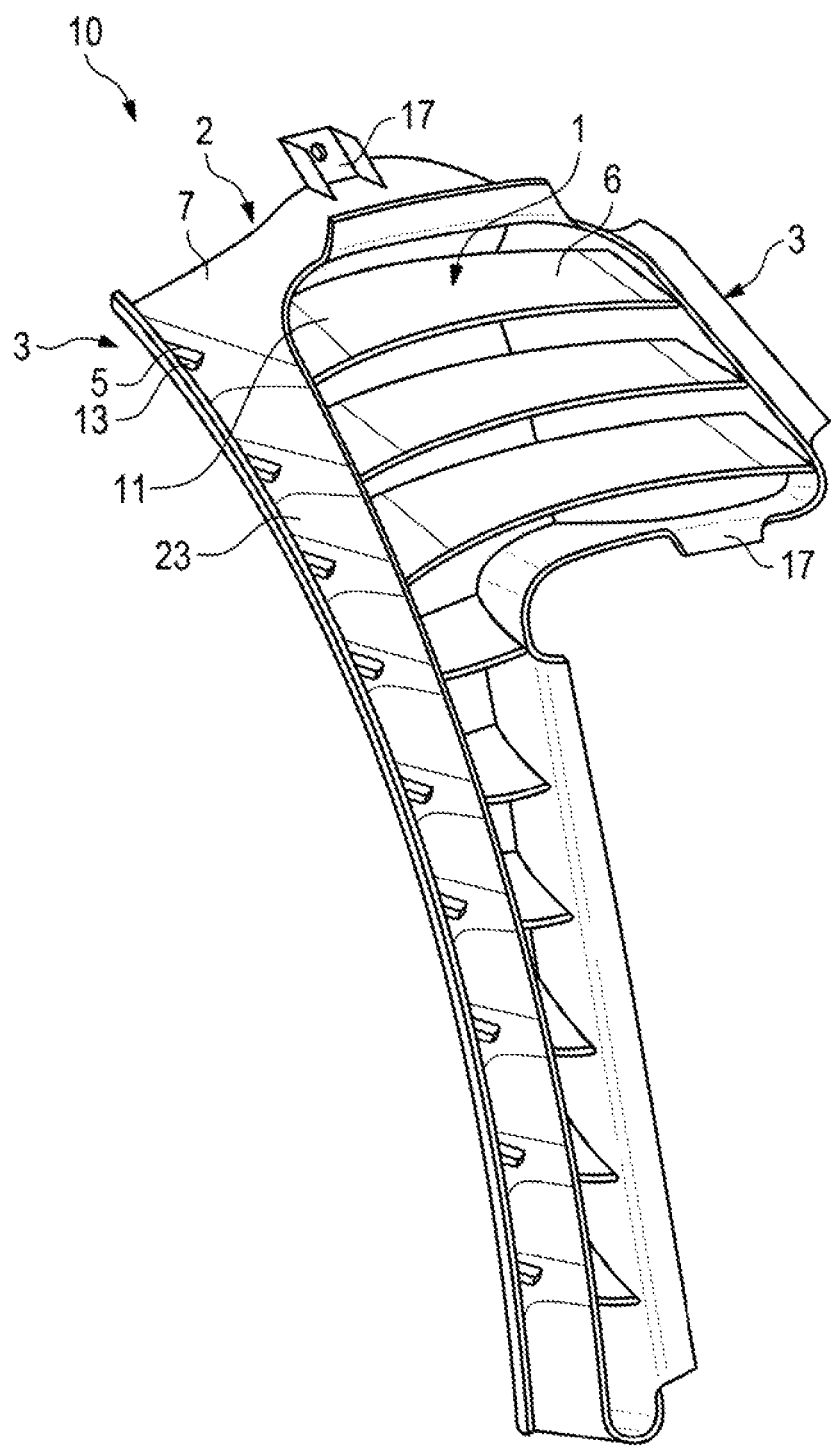
FIG. 1 shows a schematic illustration of a vehicle substructure in a perspective view.

FIG. 1 shows a vehicle substructure 10 according to aspects of the invention which here comprises a multiplicity of first components 1. The first components 1 are installed on a second component 2. The vehicle substructure 10 has been produced according to the method according to aspects of the invention.

The vehicle substructure 10 is designed here as a wing component. However, the vehicle substructure 10 can also be configured as any other component or as any other part for a motor vehicle. The first component 1 can take on any desired form here depending on requirements. For example, the first component 1 can be designed as any type of open or closed profile. The first component 1 can also be designed as a surface component and, for example, as a plate. The second component 2 can also take on any desired form.

In the case of the vehicle substructure 10 shown here, the first components 1 are designed as finned elements 6. The finned elements 6 serve in particular for entry of air through an outer skin of the vehicle. The second component 2 is designed here as a support frame 7 for the finned elements 6. The second component 2 here comprises installation devices 17 for fastening to a vehicle, for example by screwing.

The vehicle substructure 10 can be fastened, for example to a vehicle body and/or to a support component installed on the vehicle body. The vehicle substructure 10 can also be provided for the vehicle interior.

The first component 1 is manufactured from a material 11 which is not suitable for reversible deformations. For example, the material 11 is brittle and is less flexible than the material 23 of the latching device, and therefore it would break in the event of a certain bending stress or torsional stress.

The first component 1 is manufactured, for example, from a fiber composite material. For this purpose, a thermosetting plastic 11 is used here as a matrix for the embedding of carbon fibers or glass fibers or another suitable fiber reinforcement. Such a material 11 permits a stable and loadable and also visually attractive configuration of the first component 1. The first component 1 is particularly preferably manufactured from a carbon fiber reinforced plastic. The latter, owing to its characteristic material structure, can be used as what is referred to as a visible carbon component, for example in the wing region.

In order to permit an uncomplicated and at the same time stable fastening of the first component 1 to the second component 2, use is made of a latching connection. However, because of the material 11 which is suitable for reverse deformations, the first component 1 cannot be used directly for a latching connection. A first component 1 made from a thermosetting fiber composite material would, for example, break because of the lack of elasticity if said, component is intended to be clipped into place.

A latching device 3 having a flexibly deformable latching element 13 is therefore connected to the first component 1 by injection molding. The latching device 3 is manufactured here from a thermoplastic 23 and is therefore more flexible than the first component 1. Such a plastic 23 has sufficiently high deformability, and therefore the latching element 13 can be correspondingly bent during the latching-in operation without breaking.

The second component 2 here comprises a latching unit 5 which is designed as a corresponding counterpart for the latching element 13. The latching element 13 engages in the latching unit 5 in such a manner that said latching element is fixedly latched in the installed state and the latching connection cannot be released again without targeted bending of the latching element 13.

In addition to the rapid installation, such a latching connection affords the advantage that the first component 1 is aligned to match the second component 2 during the installation. This is achieved in particular by the fact that the latching element 13 can only enter the latching unit 5 if the two components 1, 2 are corresponding aligned with each other.

Figure 2:
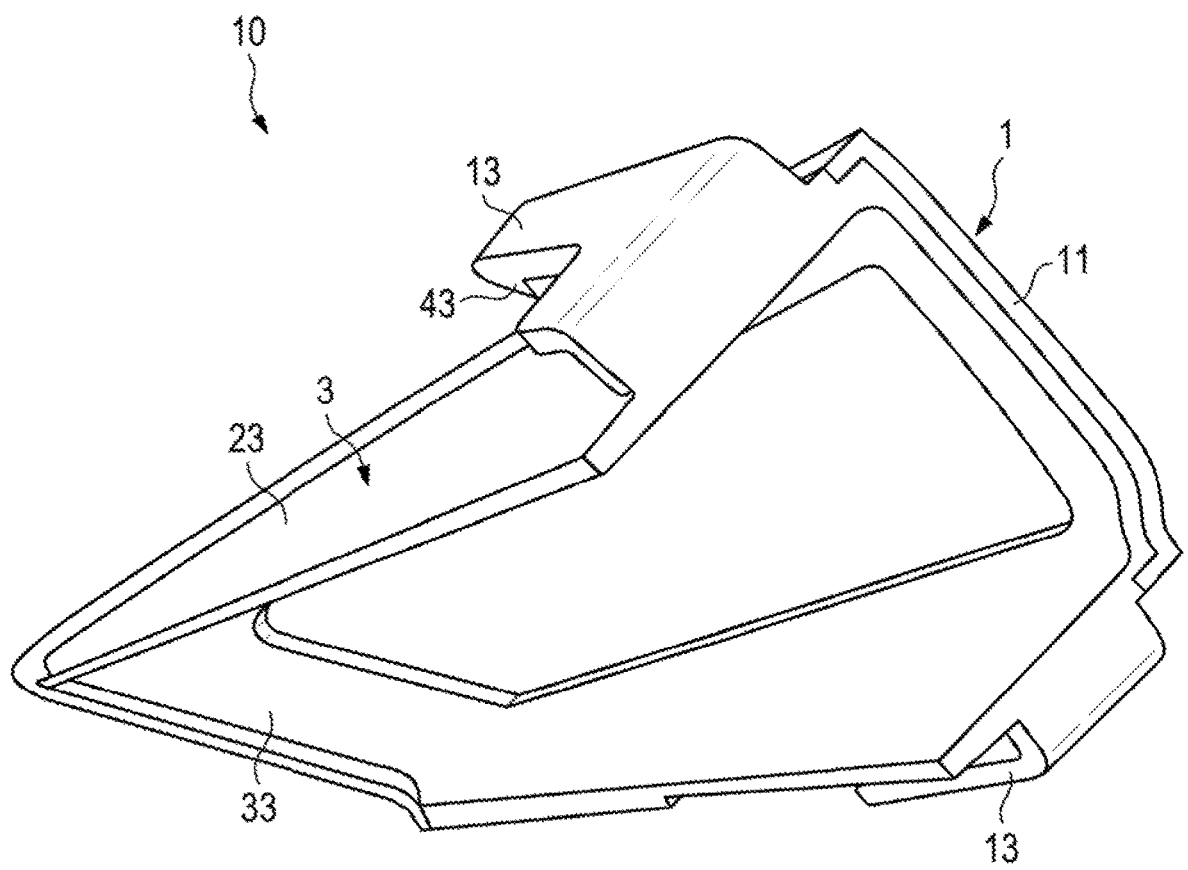
FIG. 2 shows a schematically illustrated first component of a vehicle substructure in a perspective view.
Figure 3:
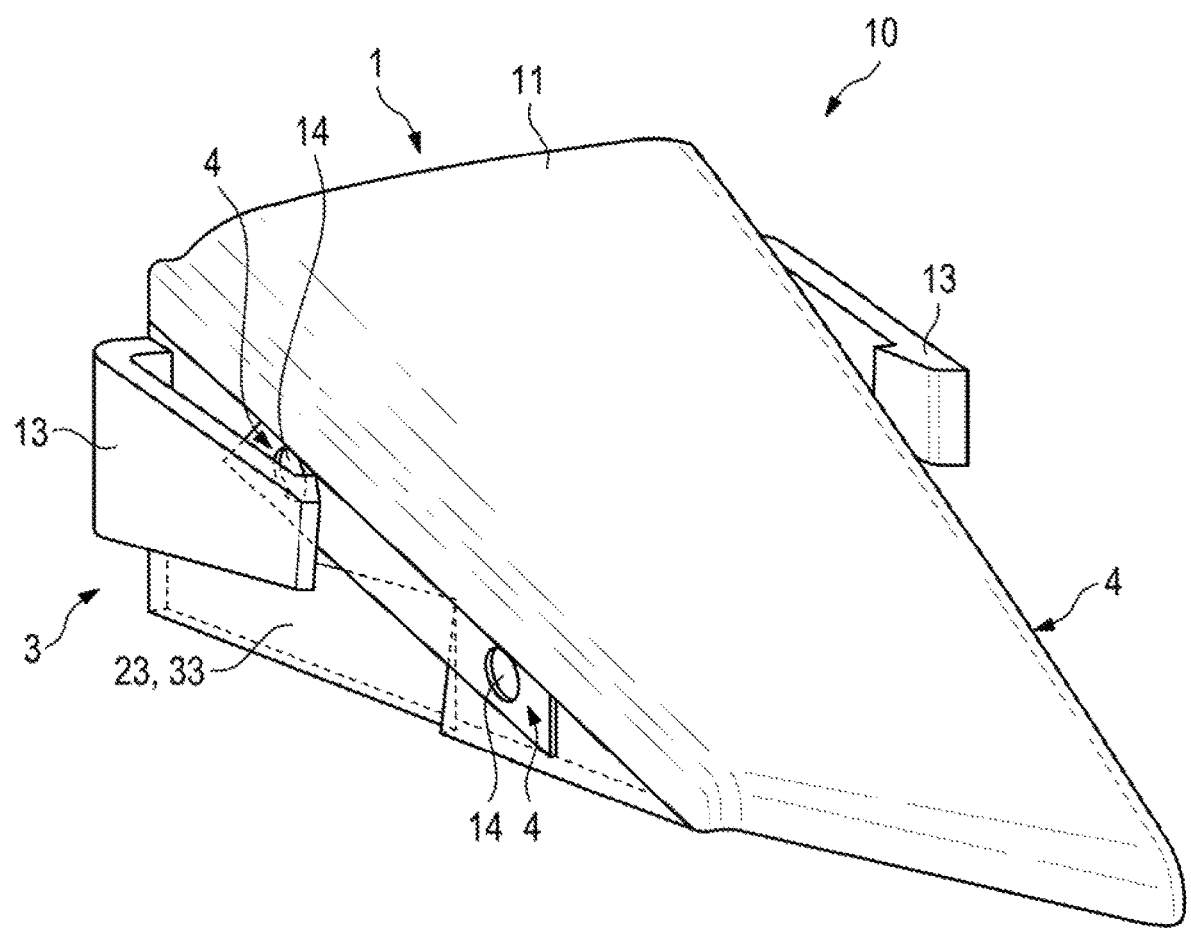
FIG. 3 shows the component of FIG. 2 from a different perspective.

FIGS. 2 and 3 show a first component 1 of a vehicle substructure 10 according to aspects of the invention in perspective illustrations in a different view in each case. The first component 1 can be used, for example, as described with regard to FIG. 1, as a finned element 6.

In order to permit installation via a latching connection, a latching device 3 is fixedly connected to the first component 1 via a flexible latching element 13. The first component 1 is formed here from a fiber composite material with a thermosetting material 11 as the matrix material. The latching device is manufactured from a thermoplastic 23.

For connection to the first component 1, the latching device 3 here comprises a frame 33. The frame 33 extends here substantially over a lower side of the first component 1, and therefore an upper side of the first component 1 remains uncovered. As a result, the visual overall appearance of the first component 1 is not influenced by the latching device 3. This is particularly advantageous in the case of visible carbon components.

The latching element 13 here has a latching hook 43 which, after latching into place, engages in a form-fitting manner in a latching unit 5 provided for it, and therefore an unintentional release of the latching connection is prevented. The latching hook 43 is arranged directed inward here. However, it is also possible for the latching hook 43 to be directed outward. The latching element 13 can also comprise two or three or more latching hooks 43.

An undercut 4 is provided here between the first component 1 and the latching device 3. The undercut 4 comprises a recess 14, designed as a bore, in the first component 1. A total of four recesses 14 are arranged here in the first component 1. The recesses 14 are arranged here on a side wing of the first component 1, which side wing is not visible in the fitted state.

The latching device 3 also extends with its frame 33 into the recesses 14 and is cast into the latter. A fixed form-fitting connection of the first component 1 with the latching device 3 is therefore produced by the arrangement of the recesses 14 and the shaping of the frame 33. A separation of both is therefore blocked in a form-fitting manner.

During the production of the vehicle substructure 10, the first component 1 is manufactured first of all. For this purpose, a fiber reinforcement and, for example, a carbon fiber material and/or a glass fiber material are embedded into a matrix material. A thermosetting plastic 11 is preferably used here as the matrix material. The fibers are preferably aligned in a targeted manner in the direction of the anticipated main loadings of the component.

After the shaping and curing of the first component 1, the recesses 14 for the undercut 4 are then incorporated. For this purpose, for example, bores and/or milled-out portions are incorporated into the first component 1.

The first component 1 is subsequently inserted into an injection molding device. The injection molding device consists, for example, of an injection mold dividable into at least two mold halves. The injection mold is configured in accordance with requirements and the shape of the first component 1. In addition, the injection molding device is designed for shaping the desired latching device 3. The number and/or positions of the latching elements 13 are selected, for example, with reference to the requirements and/or shape of the first component.

The reversibly deformable plastic 23 and in particular a thermoplastic 23 is then injected into the injection molding device. In the process, the latching device 3 which is integrally formed on the first component 1 is formed. The first component 1 is connected to the latching device 3 by the thermoplastic 23 passing through the recesses 14 provided in the first component 1. Since the recesses 14 have been arranged in a targeted manner in order to form an undercut 4, a form-fitting and secure connection is therefore produced between the first component 1 and the latching device 3. The latching device 3 is therefore shaped and at the same time connected to the first component 1 during the injection molding.

It can be provided that, by means of the injection molding, an in particular integrally bonded connection is produced between the material 11 of the first component 1 and the material 23 of the second component 2, said integrally bonded connection at least partially supporting the form-fitting connection of the undercut 4. However, it is also possible for the material 11 of the first component 1 not to enter into any connection or any load-bearing connection with the material 23 of the latching device 3, and therefore the fixed connection is provided by the undercut or by the form fit.

After the injection molding, the first component 1 is removed together with the latching device 3 from the injection molding device. Appropriate finishing can then take place. However, it is also possible for the components 1, 3 to be used after the injection molding without any finishing.

The first component 1 can subsequently be connected to a corresponding second component 2 via the latching device 3. For this purpose, the second component 2 has a latching unit 5 serving as a counterpart for the latching element 13. For example, as shown in FIG. 1, a multiplicity of first components 1 can thus be clipped to a second component 2 serving as a support frame 7.

The method presented here permits the production of a first component 1 with a latching device 3 injection molded thereon, and therefore the first component 1 can be clipped to other components 2. As a result, it is possible for components 1 to be clipped which are manufactured from a material 11, the lack of elasticity of which otherwise does not permit clipping.

| List of reference signs: | |
|---|---|
| 1 | Component |
| 2 | Component |
| 3 | Latching device |
| 4 | Undercut |
| 5 | Latching unit |
| 6 | Finned element |
| 7 | Support frame |
| 10 | Vehicle substructure |
| 11 | Material |
| 13 | Latching element |
| 14 | Recess |
| 17 | Installation device |
| 23 | Plastic |
| 33 | Frame |
| 43 | Latching hook |

What is claimed is:

1. A method for producing a vehicle substructure comprising:
   inserting a first component into an injection molding device, wherein the first component is composed of a material which is not suitable for reversible deformation;
   insert molding onto the first component a latching device having at least one deformable latching element, at least in sections, using at least one reversibly deformable plastic in the injection molding device such that the latching device is reversibly deformable; and
   forming at least one undercut between the first component and the latching device by injection molding such that the first component and the latching device are connected together in a form fitting manner while either limiting or preventing separation of the latching device from the first component, wherein the step of forming the at least one undercut further comprises forming at least one recess in the form of a hole into the first component, and introducing the reversibly deformable plastic into the recess during the injection molding.

2. The method as claimed in claim 1, further comprising forming at least a portion of the first component from a thermosetting material.

3. The method as claimed in claim 1, further comprising forming at least a portion of the first component from a fiber composite material.

4. The method as claimed claim 1, further comprising forming at least a portion of the latching device from a thermoplastic.

5. The method as claimed in claim 1, further comprising producing a second component with at least one latching unit, and connecting the second component to the first component by latching the at least one latching unit and the latching element together.

6. The method as claimed in claim 1, wherein the first component is manufactured as a finned element, and wherein the second component is manufactured as a support frame for the finned element.

7. The method as claimed in claim 1 further comprising a plurality of recesses formed in the first component.

8. A method for producing a vehicle substructure comprising:
   inserting a first component into an injection molding device, wherein the first component is composed of a material which is not suitable for reversible deformation;
   insert molding onto the first component a latching device having at least one deformable latching element, at least in sections, using at least one reversibly deformable plastic in the injection molding device such that the latching device is reversibly deformable; and
   forming at least one undercut between the first component and the latching device by injection molding such that the first component and the latching device are connected together in a form fitting manner while either limiting or preventing separation of the latching device from the first component, wherein the step of forming the at least one undercut further comprises forming at least one recess into the first component, and introducing the reversibly deformable plastic into the recess during the injection molding, wherein the recess is formed on a side surface of the first component, which is not visible in the assembled state.

9. A method for producing a vehicle substructure comprising:
   inserting a first component into an injection molding device, wherein the first component is composed of a material which is not suitable for reversible deformation;
   insert molding onto the first component a latching device having at least one deformable latching element, at least in sections, using at least one reversibly deformable plastic in the injection molding device such that the latching device is reversibly deformable; and
   forming at least one undercut between the first component and the latching device by injection molding such that the first component and the latching device are connected together in a form fitting manner while either limiting or preventing separation of the latching device from the first component, wherein the step of forming the at least one undercut further comprises forming at least one recess into the first component, and introducing the reversibly deformable plastic into the recess during the injection molding, wherein introducing the reversibly deformable plastic into the recess during the injection molding either limits or prevents separation between the first component and the latching device.

* * * * *